Patented May 1, 1923.

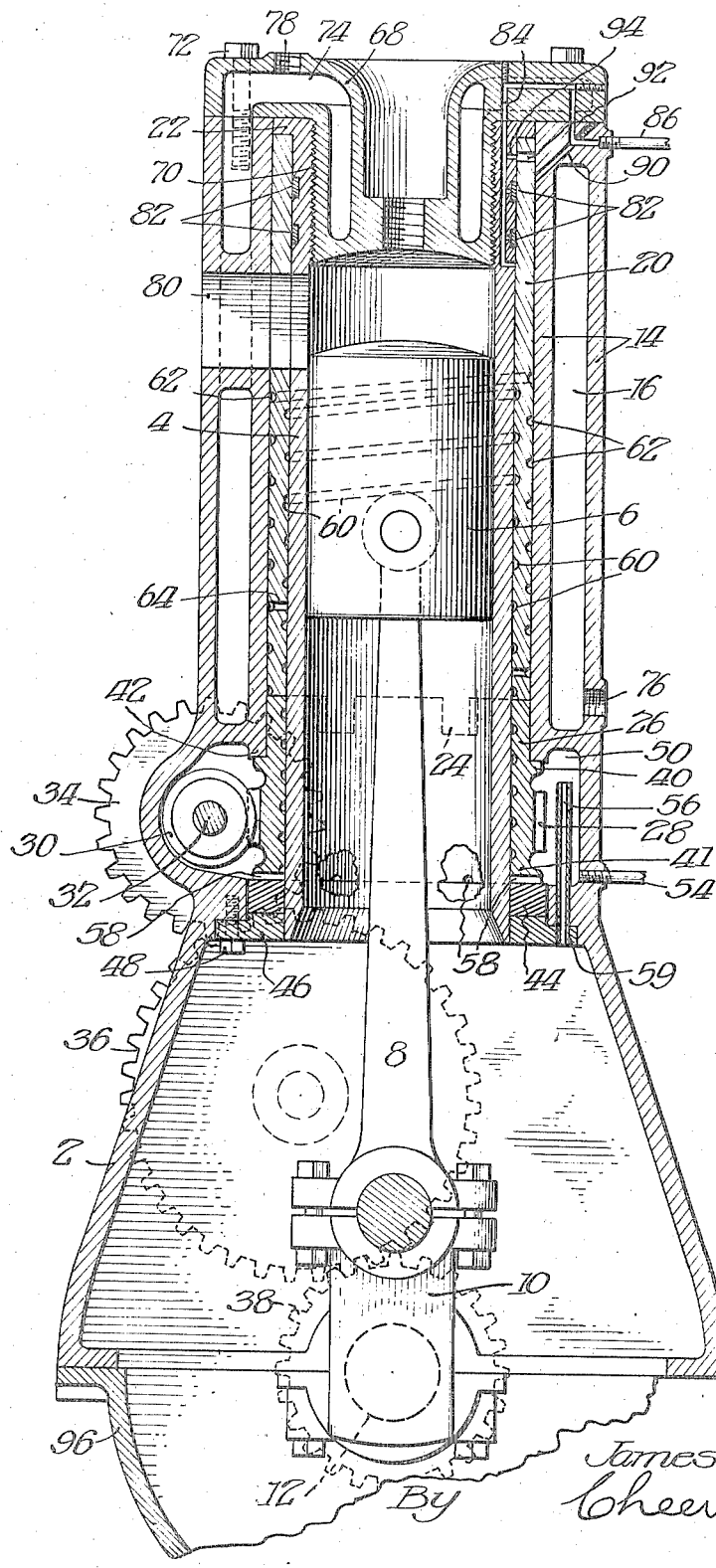

1,453,304

UNITED STATES PATENT OFFICE.

JAMES A. CHARTER, OF CHICAGO, ILLINOIS.

EXPLOSIVE ENGINE.

Application filed August 15, 1919. Serial No. 317,701.

*To all whom it may concern:*

Be it known that I, JAMES A. CHARTER, a citizen of the United States, residing at Chicago, in the county of Cook and State of Illinois, have invented a certain new and useful Improvement in Explosive Engines, of which the following is a specification.

This invention relates to explosive engines and particularly engines of the general type in which the valving operation is produced by a rotatable sleeve concentric with the axis of the cylinder. It is particularly applicable to multiple cylinder vertical gas engines.

The object of the invention is to provide a positively oiled engine which is simple and compact in construction, which is readily accessible for removal, replacement and adjustment of parts, which can be easily and cheaply made, which is satisfactory and efficient in operation, and is not readily liable to get out of order. The invention consists in a device for carrying out the foregoing objects and more particularly in features and details of construction hereafter fully set forth in the specification and claims.

The single sheet of drawing shows a vertical sectional view thru one cylinder of an engine equipped with a device of this invention in its preferred form.

The engine illustrated is provided with a crank case 2 having, rising from it, a cylinder proper 4 in which reciprocates the usual piston 6 driving a connecting rod 8 connected at its lower end to a crank arm 10 on crank shaft 12 in the ordinary manner. Integral with the crank case 2 and surrounding the cylinder 4 is the water jacket cylinder 14 having in it a water space 16. This combined water jacket and crank case is preferably made of aluminum when light weight is required. Rotatably mounted on the outside of the working cylinder 4 heretofore referred to and between it and the water jacket cylinder 14 is the sleeve valve 20 taking bearing at its upper end against an outwardly turned flange 22 on the upper end of working cylinder 4. The lower end of sleeve valve 20 proper is provided with an irregular surface which, in the particular case here illustrated, takes the form of jaws 24 detachably engaging a supplemental short cylinder 26, of corresponding diameter, provided circumferentially with worm gear teeth 28, meshing with worm 30, upon shaft 32, driven thru gearing 34, 36, and 38 from shaft 12, heretofore referred to.

The supplemental cylinder 26 has formed on it, adjacent to opposite sides of the worm wheel 28, flanged collars or projections 40 and 41 which take bearing on parts of the device to hold the supplemental cylinder 26 and consequently the worm wheel 28 against vertical end motion. In the particular case here illustrated, collar 40 bears against the end 42 of the inner wall of the water jacket and the lower collar 41 forms a step bearing of relatively wide surface on the spacing ring 44 inserted between the crank case and the inner cylinder 4 to insure a proper cylindrical space for the sleeve valve 20. This ring 44 is, in the particular case here illustrated, held in place by a separate, flanged plate 46 inserted upward from the crank case as shown and secured in place by any suitable means as for instance, set screws 48.

The parts, heretofore described, are so shaped and arranged that an annular lubricant or oil chamber 50 is formed around the supplemental cylinder 26 and the worm wheel 28 and the worm 30. One of the problems solved by this invention is the maintaining a constant supply of given quantity of lubricant in this chamber and maintaining it at a proper height therein. This is accomplished in the particular case here illustrated by providing means for supplying oil to the oil space and providing a spill-way or exit port therefrom so arranged that whenever the oil in the chamber reaches a certain point determined by the position of the entrance to said spill-way, surplus oil above the spill-way passes out of the chamber. In the particular case, here illustrated oil is supplied thru an intake pipe 54 and the spill-way takes the form of pipe 56 discharging into the crank case at 59. In actual practice the oil is continuously repumped from the engine base to the pipe 54 by the usual form of pump, not shown, so geared as to be driven by the engine itself.

The step bearing contact between supplemental cylinder 26 and the ring 44, heretofore described, is oiled by oil in passages 58 arranged at intervals around the circumference of the sleeve and communicating with chamber 50. These passages 58 also serve the function of conducting oil directly to the surface of contact between the supplemental cylinder 26 and the inner cylinder 4 and this surface is kept continuously lubricated by providing spiral or screw shaped grooves 60 which forcibly feed oil, delivered by passages 58, upward along the entire surface between the supplemental cylinders 26 and the sleeve 20.

Similarly the outer circumference of the sleeve 20 is provided with spiral grooves 62 which receive their supply of oil thru the joints between the teeth 24 and thru positively provided openings 64 placed at suitable intervals on the surface of the cylinder and leading thru it, as clearly shown in the drawing. The upper end of the main cylinder 4 is, in the particular case herein illustrated, closed by a cylinder head 68 screw threaded to the cylinder proper at 70. Where exceedingly light construction is required, this head 68 may be made of aluminum or other light material. The combined cylinder and head is detachably secured in place on the main water jacket cylinder by any suitable means as bolts or screws 72 and the head 68 is provided with a water jacket space 74 communicating with the main water jacket space 16, heretofore referred to. The water jacket space is as usual provided with suitable inlet and outlet ports 76 and 78.

The upper end of the cylinder mechanism above the valve ports 80 is provided with a more or less independent oiling system comprising a plurality of rings 82 carried by inner cylinder 4 and so constructed as to spring outward and take bearing against the inner surface of the sleeve 20. These rings 82 are continuously supplied with oil thru passages 84, supplied by pipe 86 connected to the same pump which delivers oil to pipe 54. The passages 84 are of peculiar construction in that the pipe 86 enters the main outer cylinder member 14 and is not disturbed when the cylinder head 68 and the attached inner cylinder 4 is removed for the purpose of removing the sleeve 20. The break in the oil supply is made in passage 84 and not in pipe 86.

The outer surface of the sleeve 20 is, at its upper end, provided with oil by one or two methods or both combined. The first consists in providing a small oil duct 90 communicating with passage 84 near pipe 86 and leading to the outer surface of sleeve 20. The second consists in providing, thru the sleeve itself, one or more small openings 92 registering with a supplemental duct 94 in direct communication with a portion of passage 84 in inner cylinder 4. The result of this construction is that as the sleeve 20 rotates, these ducts 92 partially or wholly fill with oil every time they pass passage 94 and then deliver their oil to the surface of contact between sleeve 20 and main cylinder 14.

The oil pressure delivered from pipe 86 thru passage 84 to rings 82 is sufficient to practically float the rings 82 in the oil in their groove.

In assembling the mechanism, the operator first takes crank case 2 and attached outer cylinder 14 and, by removing the base member 96 from the crank case, inserts supplemental cylinder 26 in position with flange 40 in contact with member 42, then places ring 44 in position and secures it in place thru the agency of plate 46 and its securing devices 48, having previously positioned shaft 32 and its worm 30. The operator now drops sleeve 20 into position with teeth 24 in mesh. He next puts in position inner cylinder 4 and attached head 68 and secures them in place by securing devices 72. When this is done it is only necessary to supply oil to pipes 54 and 86 and to, of course, insert the piston in its connecting rod, the engine, of course, being supplied with the usual carburetor and igniting mechanism not shown.

When the engine starts, the sleeve 20 rotates in unison with the supplemental cylinder 26 whereupon oil is pumped thru passages 41 and spiral passageways 60 to the surface of contact between inner cylinder 4 and the sleeve from which it passes in the manner described to the spiral passages 62 which lubricate the outer surface of the sleeve. Oil is simultaneously delivered thru the pipe 86 to both the inner and outer surfaces of the upper end of sleeve 20. During all this operation of the sleeve the inner cylinder 4 is positively centered at its top by the flange 22 bearing against the top of the outer cylinder 14 and is centered at its bottom by the ring 44 thus insuring sufficient space within which the sleeve 20 can rotate. The inner cylinder 4 extends at its lower end freely thru ring 44 and collar 46 so that the inner cylinder can expand up and down under all heat conditions of operation.

Having thus described my invention, what I claim as new and desire to secure by Letters Patent, is:

1. In mechanism of the class described, in combination with an engine cylinder, a sleeve valve having valve ports therein mounted for rotation with reference to the cylinder, gear mechanism for rotating said sleeve located within a space formed within the engine structure, means supplying oil to said gear containing space, and means at a point above the gearing and below the valve ports permitting automatic drainage therefrom of all the oil in the gear chamber in excess of a predetermined quantity.

2. In mechanism of the class described, an engine cylinder mechanism, a sleeve valve having valve ports therein rotatable therein, rotating gear mechanism for said sleeve located within a chamber formed within the cylinder mechanism, means supplying oil to said chamber, and means taking all the oil from said chamber at a predetermined point above its bottom and below the valve ports adapted to automatically maintain a given quantity of oil within said gear chamber.

3. In mechanism of the class described, an outer engine cylinder having a crank case integral therewith, an inner engine cylinder entering said outer cylinder, spaced apart therefrom at their outer ends to form a space for a sleeve valve, a spacing device between the inner and outer cylinders at their crank case ends, a locking plate for the spacing device insertable into the outer cylinder thru the crank case and means for securing said plate in place.

4. In mechanism of the class described, in combination with two spaced apart cylinders, a sleeve valve having spiral grooves formed thereon adapted to feed oil over a surface between said sleeve valve and an adjacent cylinder and also having valve ports therein rotatable between said cylinders, means for maintaining a predetermined level of oil adjacent to said sleeve valve in communication with said spiral grooves on the sleeve valve and below said valve ports.

5. In mechanism of the class described, in combination with a pair of vertically arranged stationary cylinders spaced apart one from the other and arranged to form an oil chamber in the lower portion thereof, a cylindrical member rotatably mounted in the space between said first cylinders on a step bearing at its lower end and in communication with said oil space there being perforations on the lower end of the cylindrical member and spiral grooves on its circumference communicating with said oil space whereby oil therein lubricates both the step bearing for the lower end of the cylindrical member and its circumference.

6. In mechanism of the class described, in combination with a pair of vertically arranged stationary cylinders spaced apart one from the other and arranged to form an oil chamber in the lower portion thereof, a cylindrical member rotatably mounted in the space between said first cylinders on a step bearing at its lower end and in communication with said oil space there being perforations on the lower end of the cylindrical member and spiral grooves on its circumference communicating with said oil space whereby oil therein lubricates both the step bearing for the lower end of the cylindrical member and its circumference, and means for automatically maintaining constant supply of oil in said oil space.

7. In mechanism of the class described, in combination of two spaced apart engine cylinders, a head closing the ends of said cylinders, a member rotatable in the space between the engine cylinders, an oil opening in the outer surface of the inner cylinder contacting the rotatable member, a pipe for oil leading from an outside source to a port in the outer cylinder, the whole being so formed that there is a passageway leading from said outer supply pipe thru a portion of the outer cylinder wall thence thru the cylinder head and the inner cylinder to a point communicating with said opening for the purposes set forth.

8. In mechanism of the class described, in combination of two spaced apart engine cylinders, a head closing the ends of said cylinders, a member rotatable in the space between the engine cylinders, an oil opening in the outer surface of the inner cylinder contacting the rotatable member, a pipe for oil leading from an outside source to a port in the outer cylinder, the whole being so formed that there is a passageway leading from said outer supply pipe thru a portion of the outer cylinder wall thence thru the cylinder head and the inner cylinder to a point back of said oil opening, there also being a port leading thru the inner cylinder to said last mentioned passageway, the same being in intermittent communication with one or more ports in the rotatable member whereby oil is transferred to the outer circumference of the rotatable member.

9. In mechanism of the class described, an engine crank case with an outer cylinder having a water jacket space therein integral therewith, an inner cylinder spaced apart from the outer cylinder and insertable therein to form a space for the reception of the sleeve valve, a cylinder head detachably connectible to the inner cylinder secured to the outer cylinder and having a water space therein connecting with the main water space of the outer cylinder, and means insertable thru the crank case between the outer and inner cylinders to detachably positively space them apart so as to maintain proper relationship with reference to a sleeve valve inserted between them.

10. A device of the class described, including two concentric cylinders of different sizes to form a space between them, a valve member in said space, a separate ring space member insertable between adjacent walls of the two cylinders spacing them apart to maintain the valve space constant, and another ring detachably secured to the outer cylinder positioning the space ring against endwise movement.

In witness whereof, I have hereunto subscribed my name in the presence of two witnesses.

JAMES A. CHARTER.

Witnesses:
 DWIGHT B. CHEEVER,
 MINNIE STERNBERG.